US009013165B2

United States Patent
Kalje et al.

(10) Patent No.: US 9,013,165 B2
(45) Date of Patent: Apr. 21, 2015

(54) SWITCHING REGULATOR INCLUDING A CONFIGURABLE MULTI-MODE PWM CONTROLLER IMPLEMENTING MULTIPLE CONTROL SCHEMES

(71) Applicant: Micrel, Inc., San Jose, CA (US)

(72) Inventors: Nitin Kalje, Saratoga, CA (US); Mansour Izadinia, Cupertino, CA (US)

(73) Assignee: Micrel, Inc., San Jose, CA (US)

( * ) Notice: Subject to any disclaimer, the term of this patent is extended or adjusted under 35 U.S.C. 154(b) by 149 days.

(21) Appl. No.: 13/789,460

(22) Filed: Mar. 7, 2013

(65) Prior Publication Data

US 2013/0249511 A1 Sep. 26, 2013

Related U.S. Application Data

(60) Provisional application No. 61/615,058, filed on Mar. 23, 2012.

(51) Int. Cl.
G05F 1/00 (2006.01)
G05F 1/10 (2006.01)

(52) U.S. Cl.
CPC .......................... *G05F 1/10* (2013.01)

(58) Field of Classification Search
USPC ................... 323/274, 275, 282–288
See application file for complete search history.

(56) References Cited

U.S. PATENT DOCUMENTS

| 7,443,148 | B2 | 10/2008 | Weng | |
|---|---|---|---|---|
| 7,482,791 | B2 | 1/2009 | Stoichita et al. | |
| 7,482,793 | B2 * | 1/2009 | Stoichita | 323/282 |
| 2011/0018515 | A1 * | 1/2011 | McCloy-Stevens | 323/284 |
| 2011/0050185 | A1 * | 3/2011 | Notman et al. | 323/271 |
| 2011/0215784 | A1 * | 9/2011 | Hoogzaad | 323/285 |

OTHER PUBLICATIONS

Author Unknown, "LM25037/LM25037Q Dual-Mode PWM Contoller with Alternating Outputs", Jan. 8, 2010, Texas Instruments, National Semiconductor Corporation.

* cited by examiner

*Primary Examiner* — Adolf Berhane
*Assistant Examiner* — Gary Nash
(74) *Attorney, Agent, or Firm* — Van Pelt, Yi & James LLP

(57) ABSTRACT

A multi-mode pulse width modulation (PWM) controller for a buck switching regulator includes a multi-mode PWM control circuit where the PWM control circuit is configured to operate in one of multiple control schemes selectable by a mode select signal. In one embodiment, the multi-mode PWM control circuit incorporates a peak current mode control scheme, a voltage mode control scheme, and a valley current mode control scheme. In another embodiment, the multi-mode PWM control circuit further incorporates a constant ON-time control scheme.

14 Claims, 4 Drawing Sheets

SWITCHING REGULATOR INCLUDING A CONFIGURABLE MULTI-MODE PWM CONTROLLER IMPLEMENTING MULTIPLE CONTROL SCHEMES

CROSS REFERENCE TO OTHER APPLICATIONS

This application claims priority to U.S. Provisional Patent Application No. 61/615,058 entitled CONFIGURABLE MULTI-MODE PWM CONTROLLER filed Mar. 23, 2012, which is incorporated herein by reference for all purposes.

BACKGROUND OF THE INVENTION

Switch mode power supplies or switching regulators, also referred to as DC-to-DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output on cycle by cycle basis. A feedback control circuit is used to regulate the energy transfer to maintain a constant output voltage within the desired load limits of the circuit.

The operation of the conventional switching regulator is well known and is generalized as follows. A conventional step down (buck) switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having a substantially constant magnitude. The output voltage can then be used to drive a load.

More specifically, the pair of power switches is often referred to as a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces. This insures that the inductor current ripples above and below the nominal output current. A relatively constant output voltage is maintained by the output capacitor. The low-side power switch is turned on and off for synchronous control operation.

FIG. 1 is a schematic diagram of a conventional switching regulator. Referring to FIG. 1, a switching regulator 1 includes a switching regulator controller 10 coupled to drive a pair of power switches S1 and S2 connected in series between the input voltage $V_{IN}$ and a ground potential. Power switches S1 and S2 are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain a constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator controller 10 as a feedback voltage $V_{FB}$ on a feedback node 28. The feedback voltage $V_{FB}$ is compared with the reference voltage $V_{REF}$ at an error amplifier 12. The difference between the feedback voltage $V_{FB}$ and the reference voltage $V_{REF}$ is coupled to a control circuit 14 to generate control voltages for the power switches based on a switching regulator control scheme. The control voltages are then provided to a gate drive circuit 16 to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches. The gate drive signals for the high-side power switch S1 and the low-side power switch S2 are opposite in polarities so that one power switch is turned on when the other one is turned off.

Some switching regulators employ pulse width modulation (PWM) to control the duty cycle of the power switches S1 and S2. That is, the control circuit 14 controls the ON-time of high-side power switch S1 at a fixed frequency by adjusting the pulse width. Conventional switching regulators employing PWM control are often configured using a PWM controller driving the power switches, as shown in FIG. 2. As shown in FIG. 2, a PWM controller 40 includes a PWM control circuit 42 for generating the PWM clock signal for the gate drive circuit 16 to control the power switches S1 and S2. The switching regulator of FIG. 2 can be configured using various levels of integration. For example, in some cases, the PWM controller 40 is formed as an integrated circuit where the power switches, the output inductor and the output capacitor are formed as discrete off-chip components. In other cases, the power switches and/or the output inductor/capacitor may be integrated onto the same integrated circuit as the PWM controller.

Furthermore, a switching regulator employing PWM control may further implement different control schemes, including voltage mode control or current mode control (also referred to as peak current mode control or valley current mode control). However, conventional PWM controllers for switching regulators are designed to operate using one specific control scheme. A system designer using a PWM controller designed with one control scheme wishing to change to a PWM controller with another control scheme to improve the performance of the switching regulator would have to change the controller integrated circuit. Changing the controller integrated circuit often involves changing the PC board design which leads to increase cost and causes delay in the design cycle.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a multi-mode PWM controller for a buck switching regulator implements multiple control schemes where the desired control scheme is selectable using a single input signal. In some embodiments, the multi-mode PWM controller implements a current mode control (also referred to as "peak current mode control"), a voltage mode control and a valley current mode control. The PWM controller is configurable by the single input signal to operate in a selected control scheme. In some embodiments, the PWM controller further implements a constant ON-time control. In embodiments of the present invention, the PWM controller is formed as an integrated circuit and the single input signal is a single input terminal or input pin of the integrated circuit.

Figure 1:
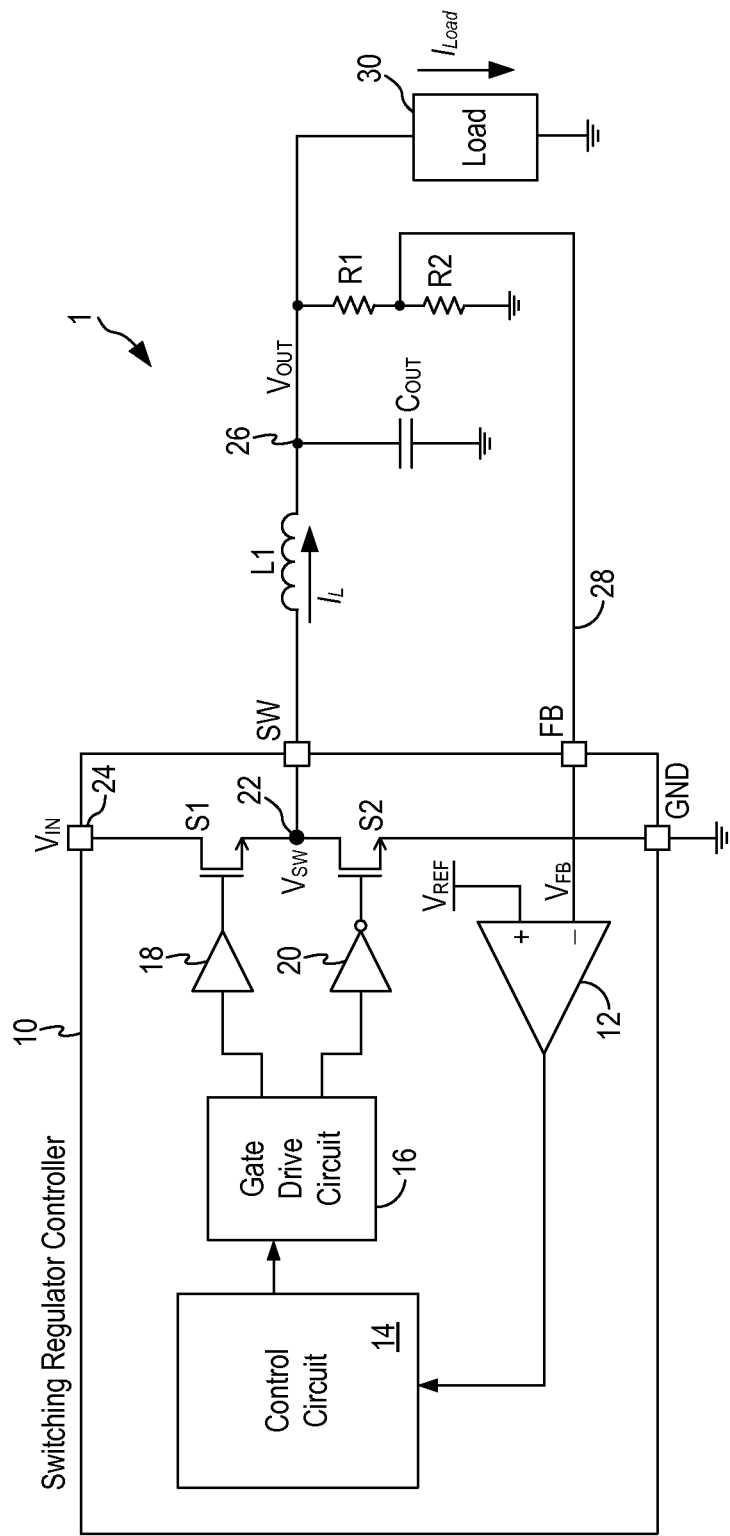
FIG. 1 is a schematic diagram of a conventional switching regulator.
Figure 2:
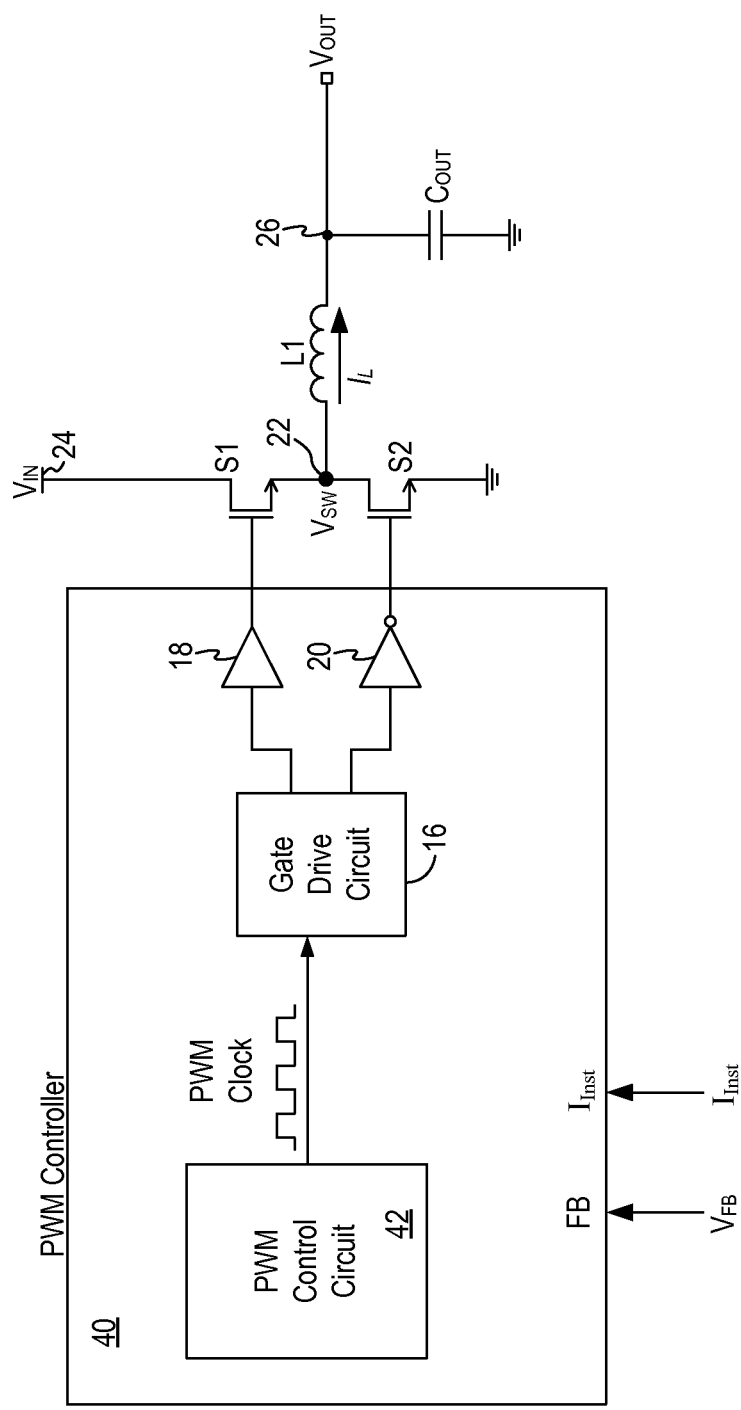
FIG. 2 is a schematic diagram of a conventional switching regulator employing PWM control.
Figure 3:
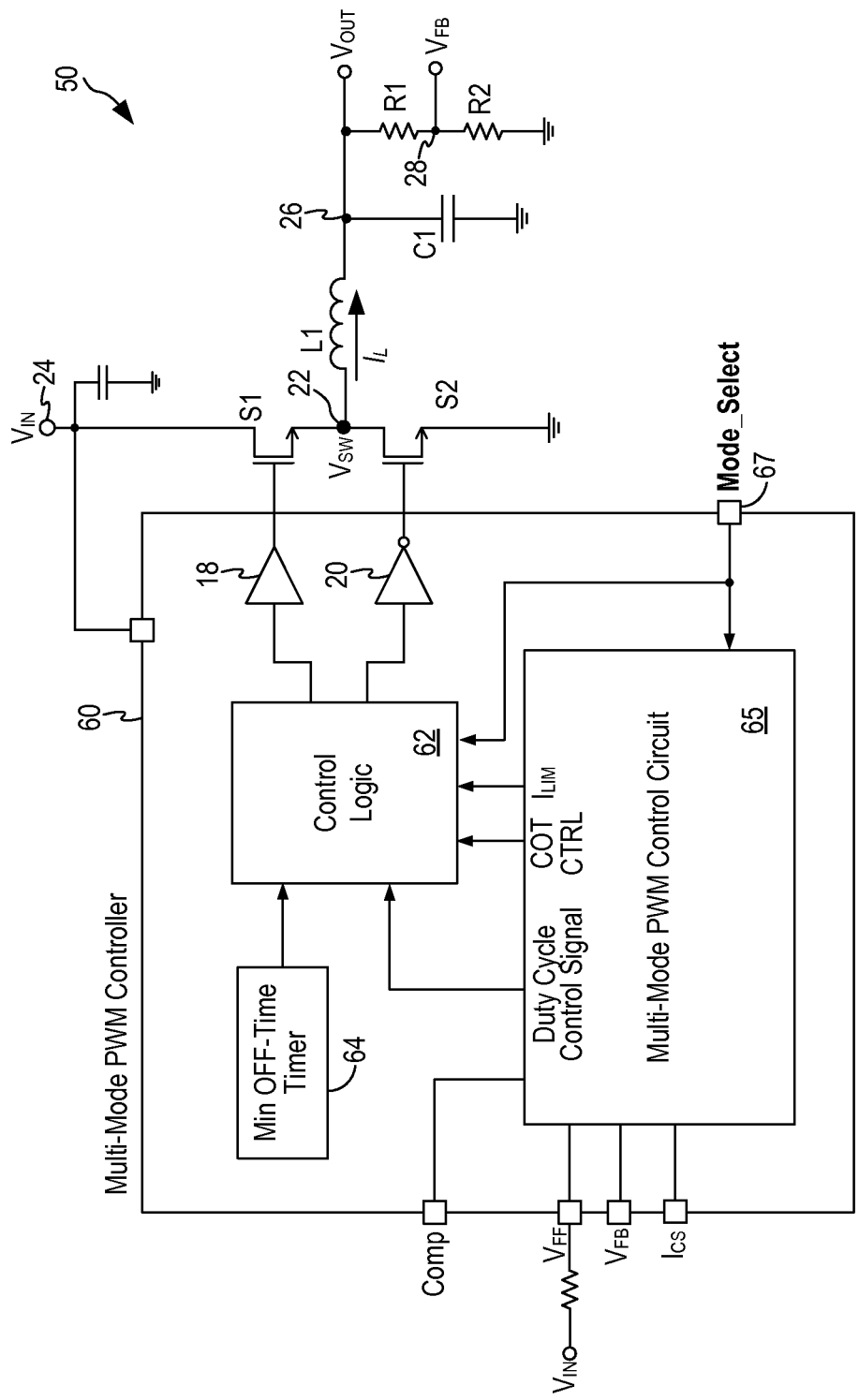
FIG. 3 is a schematic diagram of a buck switching regulator incorporating a multi-mode PWM controller according to embodiments of the present invention

FIG. 3 is a schematic diagram of a buck switching regulator incorporating a multi-mode PWM controller according to embodiments of the present invention. Referring to FIG. 3, a buck switching regulator 50 includes a multi-mode PWM controller 60 driving a pair of power switches S1 and S2 connected in series between the input voltage $V_{IN}$ and a ground potential. Power switches S1 and S2 are alternately turned on and off to generate a switching output voltage $V_{SW}$ at a switch node 22. The switching output voltage $V_{SW}$ is directly coupled to an LC filter circuit including an output inductor L1 and an output capacitor C1 to generate a regulated output voltage $V_{OUT}$ at a node 26 having a substantially constant magnitude. The output voltage $V_{OUT}$ can then be used to drive a load.

In the present illustration, the multi-mode PWM controller 60 is as an integrated circuit. The power switches, the output inductor L1 and the output capacitor C1 are formed as off-chip discrete components. In other embodiments, the power switches and the output inductor/output capacitor may be formed on-chip or off-chip of the PWM controller integrated circuit. The exact level of integration of the buck switching regulator 50 is not critical to the practice of the present invention.

Switching regulator 50 includes a feedback control circuit to regulate the energy transfer to the LC filter circuit to maintain a constant output voltage within the desired load limits of the circuit. More specifically, the feedback control circuit causes power switches S1 and S2 to turn on and off for a certain time period to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the multi-mode PWM controller 60 as a feedback voltage $V_{FB}$ on a feedback node 28.

The multi-mode PWM controller 60 includes a multi-mode PWM control circuit 65 receiving the feedback voltage $V_{FB}$. The multi-mode PWM control circuit 65 also receives a sense current $I_{CS}$ indicative of the current $I_L$ flowing through the output inductor L1, a feed-forward voltage $V_{FF}$ relating to the input voltage $V_{IN}$, and a compensation input signal Comp. The multi-mode PWM control circuit 65 generates a duty cycle control signal and a current limit $I_{LIM}$ signal for a control logic circuit 62. The control logic circuit 62 generate gate drive signals which are then provided to a high-side driver circuit 18 and a low-side driver circuit 20 to drive the high-side power switch S1 and the low-side power switch S2, respectively. The control logic circuit 62 turns on and off the high-side power switch S1 when triggered by the duty cycle control signal. In one embodiment, the power switch S1 is turned off for a minimum off time as determined by the minimum OFF-time timer 64 before the power switch S1 can be turned back on. In some embodiments, the multi-mode PWM control circuit 65 also generates a constant ON-time (COT) control signal for the control logic circuit 62 to operate the power switches in the constant ON-time mode.

In embodiments of the present invention, the multi-mode PWM control circuit 65 implements two or more control schemes to regulate the duty cycle of the power switches. In some embodiments, the control schemes can include current mode control schemes and/or a voltage mode control schemes. In one embodiment, the control schemes include a peak current mode control, a valley current mode control and a voltage mode control. The multi-mode PWM controller 60 receives a Mode_Select input signal on a node 67 which is coupled to the multi-mode PWM control circuit 65 and the control logic circuit 62 to select one of the control schemes to use. In this manner, the PWM controller 60 is configurable using only a single Mode Select input signal. In one embodiment, when the multi-mode PWM controller 60 is formed as an integrated circuit, node 67 is an input terminal or an input pin to the controller integrated circuit.

In embodiments of the present invention, the Mode_Select signal has three states—high, low and open—to select one of three control schemes. In this manner, the same multi-mode PWM controller 60 can be applied in a variety of applications and the PWM controller can be configured to use the desired control scheme for that application by applying the appropriate signal level to the Mode_Select input signal.

In some embodiments, the multi-mode PWM control circuit 65 implements a fourth control scheme. The fourth control scheme can be selected through the Mode_Select input signal by using a distinct input voltage level different from high, low or open. Alternately, two of the control schemes can be selected using the same voltage level and the control schemes being configured by other components external to the PWM controller, such as components for providing compensation or providing ripple injection.

Figure 4:
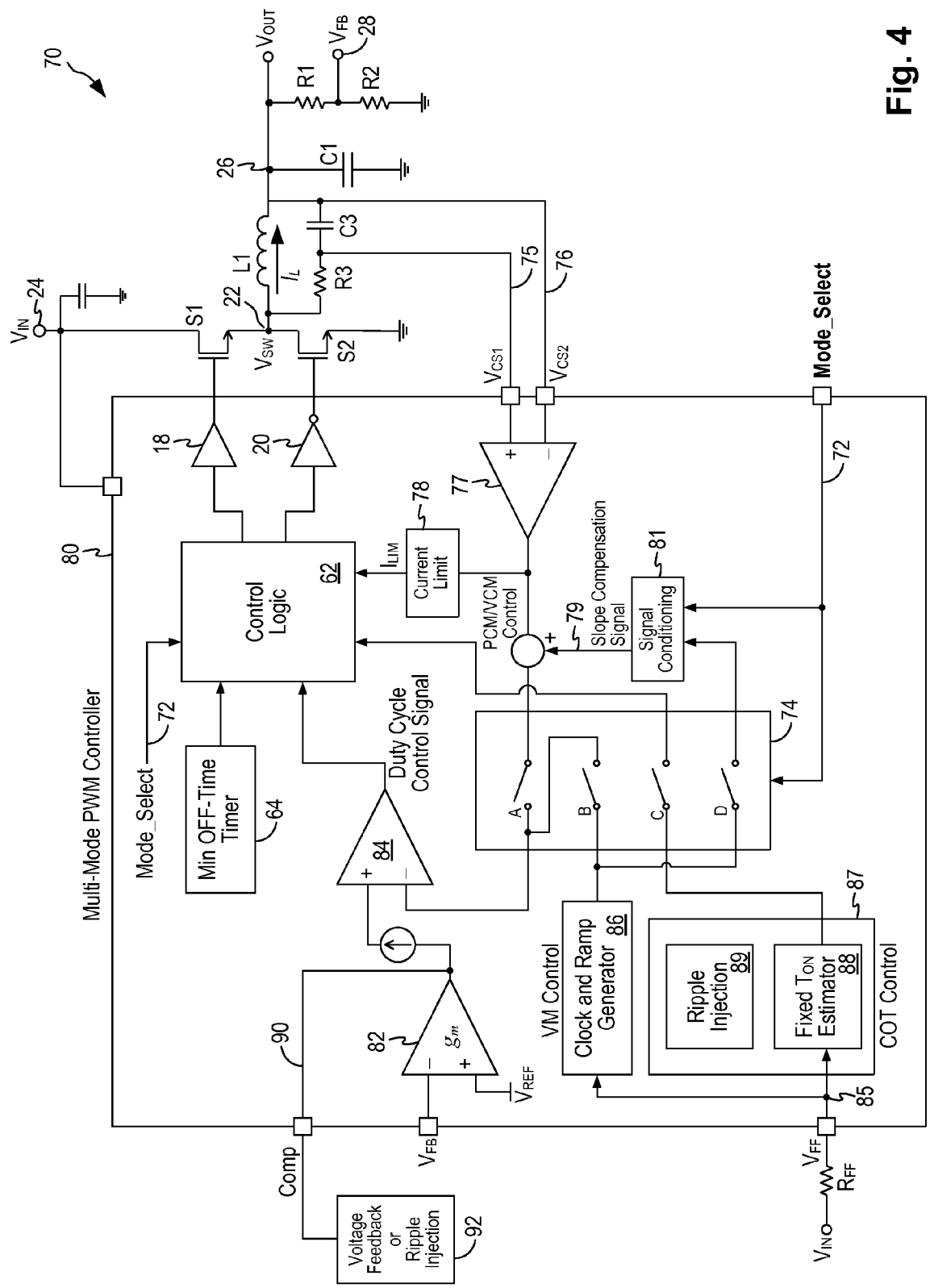
FIG. 4 is a schematic diagram of a buck switching regulator incorporating a multi-mode PWM controller according to embodiments of the present invention.

FIG. 4 is a schematic diagram of a buck switching regulator incorporating a multi-mode PWM controller according to embodiments of the present invention. More specifically, FIG. 4 illustrates the detail implementation of the multi-mode PWM control circuit in one embodiment of the present invention. Like elements in FIGS. 3 and 4 are given like reference numerals and will not be further discussed. Referring to FIG. 4, a multi-mode PWM controller 80 includes circuitry for implementing four control schemes—a peak current mode control (PCM), a voltage mode control (VM), a valley current mode control (VCM), and a constant ON-time control (COT). A salient feature of the multi-mode PWM controller of the present invention is that the four control schemes are implemented using shared circuitry so that the PWM controller can be realized using minimal silicon real estate, thereby reducing manufacturing cost.

In operation, the switching regulator 70 includes a feedback control loop to regulate the output voltage $V_{OUT}$. In the present embodiment, a voltage divider including resistors R1 and R2 is used to divide down the output voltage $V_{OUT}$ which is then fed to the multi-mode PWM controller 80 as a feedback voltage $V_{FB}$ on a feedback node 28. The feedback voltage $V_{FB}$ is compared with a reference voltage $V_{REF}$ at an error amplifier 82. The error amplifier 82 generates an error signal indicative of the difference between the feedback voltage $V_{FB}$ and the reference voltage $V_{REF}$. In the present embodiment, the error amplifier 82 is a transconductance amplifier and thus provides an output current signal as the error signal. The error signal is provided to a PWM comparator 84 to generate a duty cycle control signal. The duty cycle control signal is then provided to the control logic circuit 62 which generates the gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches S1 and S2. The gate drive signals for the high-side power switch S1 and the low-side power switch S2 are opposite in polarities so that one power switch is turned on when the other one is turned off. Additional logic circuit may be required to ensure the two switches S1 and S2 do not remain ON at the same time. In operation, the control logic circuit 62 turns on and off the high-side power switch S1 when triggered by the duty cycle control signal. In one embodiment, the power switch S1 is turned off for a minimum off time as determined by the minimum OFF-time timer 64.

The duty cycle control signal is generated by the PWM comparator 84 based on a selected switching regulator control scheme. More specifically, the PWM comparator 84 receives the error signal from the error amplifier 82 on a positive input terminal. The PWM comparator 84 further receives a control signal from a selection circuit 74 on a negative input terminal. The selection circuit 74 provides the control signal to the PWM comparator 84 based on the control scheme selected by the Mode_Select signal (node 72). The control signal is compared with the error signal at the PWM comparator 84 to generate the duty cycle control signal. The Mode_Select signal (node 72) is also coupled to the control logic circuit 62 and a signal conditioning circuit 81 to select the desired control scheme.

In the present embodiment, the selection circuit 74 operates to select one of four control schemes: PCM control, VM control, VCM control and COT control. The operation and selection of each control scheme will be described in more detail below.

Peak Current Mode Control

When the Mode_Select Signal (node 72) has a signal level for selecting the peak current mode (PCM) control, switches A and D in the selection circuit 74 are closed while switches B and C are open. Under PCM control, the high-side power switch S1 is turned on at the beginning of the switching cycle. The inductor current is monitored to detect the peak current value. When the peak current value is reached, the high-side power switch S1 is turned off.

In the present embodiment, the inductor current or the peak inductor current is measured, such as by a resistor R3 and a capacitor C3 connected in parallel with the inductor L1. In other embodiments, the peak inductor current can be measured at the power switches S1 and S2. The measured current on nodes 75 and 76 are coupled to a current amplifier 77 to generate an amplified current signal. Slope compensation is applied to the amplified current signal by introducing a slope compensation signal 79 to the amplified current signal. The compensated current signal is then provided through switch A to the negative input terminal of the PWM comparator 84. Meanwhile, the Mode_Select signal 72 directs the control logic circuit 62 to operate in the peak current mode. In this manner, the measured peak inductor current is compared against the error signal from the error amplifier 82 to generate the duty cycle control signal for the control logic circuit 62.

In the present embodiment, the slope compensation signal 79 is generated by a ramp generator 86 which receives a feedforward voltage $V_{FF}$ (node 85) as the input signal. The ramp generator output signal is coupled through switch D to a signal conditioning circuit 81. Signal conditioning circuit 81 generates the slope compensation signal 79 having the appropriate signal polarity for peak current control. The feedforward voltage $V_{FF}$ is generated by coupling the input voltage Vin through a feedforward resistor $R_{FF}$.

In the present embodiment, the sensed and amplified inductor current is also used for current limit in PWM controller 80. The amplified current signal of the current amplifier 77 is provided to a current limit circuit 78 to generate a current limit signal $I_{LIM}$ which is provided to the control logic circuit 62. The current limit signal $I_{LIM}$ have a signal level indicating whether the inductor current is below or above a predetermined current limit. Control logic circuit 62 operates based on the current limit signal $I_{LIM}$ to control the power switches so that the maximum current level is not exceeded.

Voltage Mode Control

When the Mode_Select Signal (node 72) has a signal level for selecting the voltage mode (VM) control, switch B of the selection circuit 74 is closed while switches A, C and D are open. Under VM control, a ramp signal generated by the ramp generator 86 is coupled through switch B to the negative input terminal of the PWM comparator 84 to realize voltage mode control. As described above, the ramp generator 86 receives a feedforward voltage $V_{FF}$ (node 85) as the input signal. The feedforward voltage $V_{FF}$ is related to the input voltage $V_{IN}$ of the switching regulator. In this manner, the ramp generator output signal is compared against the error signal from the error amplifier 82 to generate the duty cycle control signal for the control logic circuit 62.

In operation, when VM control is selected and switch B is closed, switch D is open as no slope compensation is needed. Thus switch B and switch D are complementary of each other. When one switch is open, the other is closed. In this manner, the ramp generator 86 may be used in VM control to generate the voltage ramp signal for the PWM comparator 84 and in PCM control to generate the slope compensation signal. The same circuitry is applied for different control schemes to better utilize the circuitry of the PWM controller.

Valley Current Mode Control

When the Mode_Select Signal (node 72) has a signal level for selecting the valley current mode (VCM) control, switches A and D of the selection circuit 74 are closed while switches B and C are open. Under VCM control, the high-side power switch S1 is turned off at the beginning of the switching cycle. The inductor current is monitored to detect when the inductor current decreases to a minimum (the valley). When the inductor current decreases to a minimum, the high-side power switch S1 is turned on.

The valley current mode operates in a similar manner as the peak current mode where the inductor current is measured by resistor R3 and capacitor C3 and amplified by the current amplifier 77. Slope compensation is applied by the slope compensation signal 79. However, the Mode_Select signal 72, also applied to the signal conditioning circuit 81, conditions the ramp generator output signal, coupled through switch D, to have the appropriate signal polarity for valley current control. The compensated current signal is then provided through switch A to the negative input terminal of the PWM comparator 84. Meanwhile, the Mode_Select signal 72 directs the control logic circuit 62 to operate in the valley current mode. In this manner, the measured valley inductor current is compared against the error signal from the error amplifier 82 to generate the duty cycle control signal for the control logic circuit 62.

Constant ON-Time Control

In embodiments of the present invention, the multi-mode PWM controller 80 is configured for constant ON-time control. When the Mode_Select Signal (node 72) has a signal level for selecting the COT control, switches A and C of the selection circuit 74 are closed while switches B and D are open.

In the present embodiment, the multi-mode PWM controller 80 includes a COT control block 87 which includes a fixed ON-time ($T_{ON}$) estimator 88. Constant ON-time control relies on the ripple component in the output voltage signal to regulate the output voltage magnitude. Because of the switching action at the power switches, all switch-mode regulators generate an output ripple current through the switched output inductor L1. This current ripple manifests itself as an output voltage ripple due, principally, to the equivalent series resistance (ESR) in the output capacitor C1 placed in parallel with the load. In some embodiments, the output capacitor C1 is implemented using a very low ESR capacitor. In that case, the switching regulator incorporates a ripple injection circuit to inject the necessary ripple to the feedback signal to enable COT control.

In embodiments of the present invention, the ripple injection circuit may be on-chip (such as a ripple injection circuit 89) or off-chip (such as a ripple injection circuit 92). The exact configuration of the ripple injection circuit is not critical to the practice of the present invention. In some embodiments, the PWM controller 80 implements the constant ON time and ripple current injection circuit and method described in U.S. Pat. No. 7,482,791 and U.S. Pat. No. 7,482,793. Ripple injection circuit 89 or 92 are optional and only one circuit is required when ripple injection is needed. Both circuits are shown in FIG. 4 for illustrative purpose only.

Under COT control, a fixed ON-time signal generated by the fixed ON-time estimator 88 is applied through switch C to the control logic circuit 62. In the present embodiment, ripple is injected to the error signal generated by the error amplifier 82. In one embodiment, the ripple injection circuit 92 is used to provide ripple injection to the compensation COMP input terminal 90 which is coupled to the output of the error amplifier 82. In other embodiments, the on-chip ripple injection circuit 89 is used to apply ripple injection to the error signal. The error signal with the injected ripple is coupled to the positive input terminal of the PWM comparator 84. Meanwhile, the inductor current is applied through switch A to the negative input terminal of the PWM comparator 84. In this case, no slope compensation is applied as switch D is open.

The Mode_Select signal 72 directs the control logic circuit 62 to operate in the constant ON-time mode. In this manner, the measured inductor current is compared against the error signal with ripple from the error amplifier 82 to generate the duty cycle control signal for the control logic circuit 62. The control logic circuit 62 receives the duty cycle control signal and the fixed ON-time signal to generate the gate drive signals for the high-side switch S1 and the low-side switch S2. In particular, the high-side switch S1 is turned on for the fixed ON time and switch S1 is turned off for the minimum OFF time before it can be turned back on again. The duty cycle control signal determines when switch S1 should be turned back on after the minimum OFF time.

The COT control scheme is optional and may be omitted in other embodiments of the present invention. In that case, the ripple injection circuit can also be omitted.

Advantages

A salient feature of the PWM controller of the present invention is that the same PWM controller can be configured to operate in different control schemes by using only a single pin—the Mode_Select pin. Thus, only minimal external components are required to configure the PWM controller to allow the PWM controller to be applied in a wide variety of applications.

When using conventional switching regulators, a system designer must decide in advance which control scheme is suitable. If the designer wishes to change to use another control scheme later, such change would involve significant design changes, such as redesign of the PC board.

The PWM controller of the invention provides flexibility to the system designer where a particular switching regulator control scheme does not need to be decided and the designer may incorporate the controller and reconfigure the controller at a later time to select a control scheme that is desirable for that application.

In other words, the PWM controller of the present invention allows the control scheme to be changed without the redesigning the PC board. The configurable nature of the PWM controller of the present invention increases design flexibility and significantly reduces design cycle time. The same controller can be applied to many different system designs and can improve first pass design success for many DC-DC converter designs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multi-mode pulse width modulation (PWM) controller for a buck switching regulator, the switching regulator receiving an input voltage and controlling a high-side switch and a low-side switch using a feedback control loop to generate a switching output voltage, the switch output voltage being applied to an LC filter circuit to generate a regulated output voltage having a substantially constant magnitude on an output node, the PWM controller comprising:

a multi-mode PWM control circuit configured to receive a feedback voltage indicative of the regulated output voltage, a current sense signal indicative of an inductor current of the LC filter circuit, and a mode select signal, the PWM control circuit configured to incorporate two or more control schemes selectable by the mode select signal, the PWM control circuit being configured to operate in a selected control scheme to generate a duty cycle control signal;

a control logic circuit configured to receive the duty cycle control signal and the mode select signal, the control logic circuit being configured to generate gate drive signals for controlling the high-side switch and the low-side switch; and a minimum OFF-time timer configured to provide a minimum off time signal to the control logic circuit, the minimum off time signal determining the minimum time the high-side switch is to be turned off before being turned back on, wherein the mode select signal is applied to configure the PWM control circuit and the control logic circuit to operate in one of the two or more control schemes.

2. The multi-mode PWM controller of claim 1, wherein the multi-mode PWM control circuit is configured to incorporate at least a peak current mode control scheme, the peak current mode control scheme being configured to regulate the output voltage by monitoring the peak current value of the inductor current.

3. The multi-mode PWM controller of claim 1, wherein the multi-mode PWM control circuit is configured to incorporate at least a voltage mode control scheme, the voltage mode control scheme being configured to regulate the output voltage by comparing the feedback voltage to a ramp signal.

4. The multi-mode PWM controller of claim 3, wherein the PWM control circuit is further configured to receive a feedforward voltage indicative of the input voltage and further comprises a ramp generator, the feedforward voltage being applied to the ramp generator to generate the ramp signal.

5. The multi-mode PWM controller of claim 1, wherein the multi-mode PWM control circuit is configured to incorporate at least a valley current mode control scheme, the valley current mode control scheme being configured to regulate the output voltage by monitoring the valley current value of the inductor current.

6. The multi-mode PWM controller of claim 1, wherein the multi-mode PWM control circuit is configured to incorporate at least a constant ON-time control scheme, the PWM control circuit is further configured to provide a fixed ON-time signal to the control logic circuit when the constant ON-time control scheme is selected, the constant ON-time control scheme is configured to regulate the output voltage by turning on the high-side power switch for the fixed ON time signal and turning off the high-side power switch, the duty cycle control signal determining when the high-side power switch is to be turned on again.

7. The multi-mode PWM controller of claim 6, wherein the multi-mode PWM control circuit is further configured to receive a ripple injection signal, the ripple injection signal being applied to the feedback voltage when the constant ON-time control scheme is selected by the mode select signal.

8. The multi-mode PWM controller of claim 7, wherein the PWM control circuit comprises a ripple injection circuit to generate the ripple injection signal.

9. The multi-mode PWM controller of claim 6, wherein the PWM control circuit is further configured to receive a feedforward voltage indicative of the input voltage, the feedforward voltage being applied to generate the fixed ON-time signal.

10. The multi-mode PWM controller of claim 1, wherein the multi-mode PWM control circuit comprises:

an error amplifier configured to receive the feedback voltage and a reference voltage, the error amplifier generating an error signal; and a PWM comparator configured to receive the error signal and a control signal, the control signal being associated with the selected control scheme.

11. The multi-mode PWM controller of claim 10, wherein the error amplifier comprises a transconductance amplifier and the error signal comprises a current signal.

12. The multi-mode PWM controller of claim 1, wherein the multi-mode PWM control circuit comprises:

a current amplifier configured to amplify the current sense signal; and a slope compensation circuit configured to provide slope compensation to the amplified current sense signal.

13. The multi-mode PWM controller of claim 1, wherein the feedback voltage is a divided down voltage of the regulated output voltage.

14. A multi-mode pulse width modulation (PWM) controller for a buck switching regulator, the switching regulator receiving an input voltage and controlling a high-side switch and a low-side switch using a feedback control loop to generate a switching output voltage, the switch output voltage being applied to an LC filter circuit to generate a regulated output voltage having a substantially constant magnitude on an output node, the PWM controller comprising:

a multi-mode PWM control circuit configured to receive a feedback voltage indicative of the regulated output voltage, a current sense signal indicative of an inductor current of the LC filter circuit, and a mode select signal, the PWM control circuit configured to incorporate two or more control schemes selectable by the mode select signal, the PWM control circuit being configured to operate in a selected control scheme to generate a duty cycle control signal; and a control logic circuit configured to receive the duty cycle control signal and the mode select signal, the control logic circuit being configured to generate gate drive signals for controlling the high-side switch and the low-side switch, wherein the mode select signal is applied to configure the PWM control circuit and the control logic circuit to operate in one of the two or more control schemes; and wherein the multi-mode PWM control circuit comprises a current amplifier configured to amplify the current sense signal and a slope compensation circuit configured to provide slope compensation to the amplified current sense signal.

* * * * *